(12) United States Patent
Asayama (10) Patent No.: US 9,268,109 B2
(45) Date of Patent: Feb. 23, 2016

(54) LENS BARREL AND OPTICAL APPARATUS

(75) Inventor: Masateru Asayama, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/000,585

(22) PCT Filed: Mar. 12, 2012

(86) PCT No.: PCT/JP2012/056272
§ 371 (c)(1),
(2), (4) Date: Dec. 11, 2013

(87) PCT Pub. No.: WO2012/128101
PCT Pub. Date: Sep. 27, 2012

(65) Prior Publication Data
US 2014/0092486 A1    Apr. 3, 2014

(30) Foreign Application Priority Data
Mar. 23, 2011  (JP) .................. 2011-064654

(51) Int. Cl.
*G02B 7/02* (2006.01)
*G02B 7/04* (2006.01)
*G02B 7/10* (2006.01)

(52) U.S. Cl.
CPC .. *G02B 7/04* (2013.01); *G02B 7/02* (2013.01); *G02B 7/10* (2013.01)

(58) Field of Classification Search
CPC ............... G02B 7/02; G02B 7/04; G02B 7/10
USPC ................................................. 359/826, 827
See application file for complete search history.

(56) References Cited

U.S. PATENT DOCUMENTS

2004/0207936 A1  10/2004  Yamamoto et al.
2005/0231832 A1  10/2005  Aoki et al.

FOREIGN PATENT DOCUMENTS

| CN | 1690756 | 11/2005 |
|---|---|---|
| JP | 5-281448 | 10/1993 |
| JP | 10-148748 | 6/1998 |
| JP | 2004-163484 | 6/2004 |
| JP | 2004-212884 | 7/2004 |

(Continued)

OTHER PUBLICATIONS

International Search Report mailed Apr. 3, 2012 in corresponding International Application No. PCT/JP2012/056272.

(Continued)

*Primary Examiner* — William Choi (57) ABSTRACT

Provided is a lens barrel capable of providing good operational feeling, the lens barrel including: a first barrel in which a cam groove having a shape curved with respect to a predetermined axis direction is formed to pierce through the first barrel; a second barrel capable of rotating around the predetermined axis along an outer circumferential surface of the first barrel, a straight groove extending in the predetermined axis direction being formed in the second barrel; a moving member that has a cam pin moving along the cam groove and the straight groove and moves in the predetermined axis direction while holding a lens inside the first barrel as the second barrel rotates with respect to the first barrel; and a damping mechanism that applies damping force depending on an angle of the cam groove to the predetermined axis direction to the second barrel.

40 Claims, 7 Drawing Sheets

(56) References Cited

FOREIGN PATENT DOCUMENTS

| | | |
|---|---|---|
| JP | 2007-212685 | 8/2007 |
| JP | 2009-169232 | 7/2009 |

OTHER PUBLICATIONS

Japanese Office Action dated Oct. 21, 2014 in corresponding Japanese Patent Application No. 2011-064654.

Chinese Office Action issued Dec. 2, 2014 in corresponding Chinese Patent Application No. 201280010853.2.

LENS BARREL AND OPTICAL APPARATUS

TECHNICAL FIELD

The present invention relates to a lens barrel and an optical apparatus.

BACKGROUND ART

To allow a user to operate a zooming ring of a lens barrel with constant operating torque without feeling play, there has been conventionally suggested a method that arranges rubber member between the zooming ring and a fixed barrel to bias the zooming ring simultaneously in the optical axis direction and the radial direction of the zooming ring (see Patent Document 1, for example).

PRIOR ART DOCUMENTS

Patent Documents

Patent Document 1: Japanese Patent Application Publication No. 2009-169232

SUMMARY OF THE INVENTION

Problems to be Solved by the Invention

However, in Patent Document 1, constant biasing force is exerted on the zooming ring with the elastic member at all times. Thus, when the technique of Patent Document 1 is applied to a lens barrel in which force (resisting force) exerted against the zooming ring during the rotation of the zooming ring depends on a position of the zooming ring (an angle to the fixed barrel), a user may fail to operate the zooming ring with constant operating torque.

The present invention has been made in the view of the above problems, and has an objective to provide a lens barrel and an optical apparatus that are capable of reducing a change in operating torque.

Means for Solving the Problems

The lens barrel of the present invention is a lens barrel including: a first barrel in which a cam groove having a shape curved with respect to a predetermined axis direction is formed to pierce through the first barrel; a second barrel capable of rotating around the predetermined axis along an outer circumferential surface of the first barrel, a straight groove extending in the predetermined axis direction being formed in the second barrel; a moving member that has a cam pin moving along the cam groove and the straight groove and moves in the predetermined axis direction while holding a lens inside the first barrel as the second barrel rotates with respect to the first barrel; and a damping mechanism that applies damping force depending on an angle of the cam groove to the predetermined axis direction to the second barrel.

Alternatively, the lens barrel of the present invention is a lens barrel including: a first barrel in which a straight groove extending in a predetermined axis direction is formed to pierce through the first barrel; a second barrel capable of rotating around the predetermined axis along an outer circumferential surface of the first barrel, a cam groove having a shape curved with respect to the predetermined axis direction being formed in the second barrel; a moving member that has a cam pin moving along the straight groove and the cam groove and moves in the predetermined axis direction while holding a lens inside the first barrel as the second barrel rotates with respect to the first barrel; and a damping mechanism that applies damping force depending on an angle of the cam groove to the predetermined axis direction to the second barrel.

In the aforementioned cases, the damping mechanism may include a contacting member that is provided in the outer circumferential surface of the first barrel and makes contact with at least a part of an inner circumferential surface of the second barrel, and the contacting member may have a contacting/non-contacting state with the inner circumferential surface of the second barrel that is changed in accordance with a position of the cam pin in the cam groove.

In addition, the damping mechanism may include a contacting member that is provided in an inner circumferential surface of the second barrel and makes contact with at least a part of the outer circumferential surface of the first barrel, and the contacting member may have a contacting/non-contacting state with the outer circumferential surface of the first barrel that is changed in accordance with a position of the cam pin in the cam groove.

In addition, the damping mechanism may include a contacting member that is provided in the outer circumferential surface of the first barrel and makes contact with at least a part of an inner circumferential surface of the second barrel, and the contacting member may make contact with one of regions with different friction coefficients in the inner circumferential surface of the second barrel in accordance with a position of the cam pin in the cam groove. In addition, the damping mechanism may include a contacting member that is provided in an inner circumferential surface of the second barrel and makes contact with at least a part of the outer circumferential surface of the first barrel, and the contacting member may make contact with one of regions having different friction coefficients provided in the outer circumferential surface of the first barrel in accordance with a position of the cam pin in the cam groove.

In addition, the contacting member may be urged by force directed toward a plane facing the contacting member at all times.

The optical apparatus of the present invention includes the lens barrel of the present invention.

Effects of the Invention

The lens barrel and the optical apparatus of the present invention have effects that a change in operating torque can be reduced.

MODES FOR CARRYING OUT THE INVENTION

Figure 1:
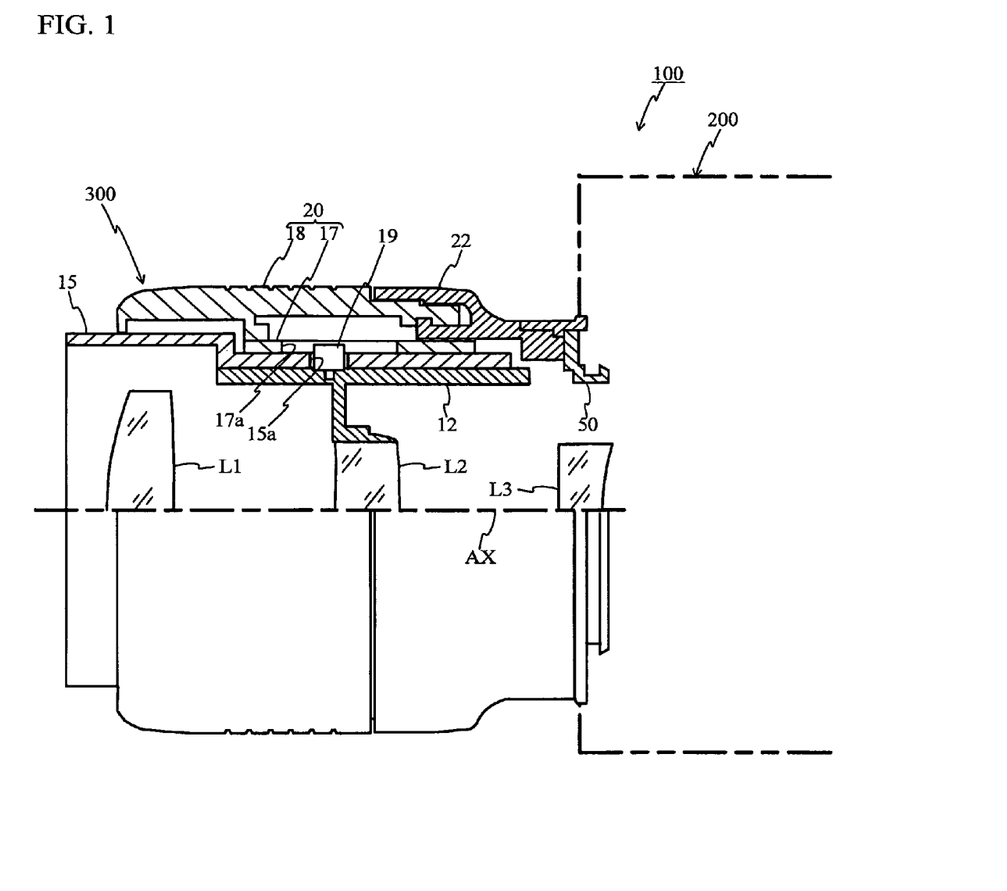
FIG. 1 is a partly cross-sectional view illustrating a structure of a camera in accordance with an embodiment.

Hereinafter, a description will be given of an exemplary embodiment with reference to FIG. 1 through FIG. 6. FIG. 1 is a partly cross-sectional view schematically illustrating a structure of a camera 100 in accordance with the exemplary embodiment.

The camera 100 includes a camera body 200 and a lens barrel 300. The camera body 200 includes a chassis, and various optical systems, an imaging element, and a shutter housed in the chassis. A part of the chassis of the camera body 200 has a camera mount. The camera mount can engage with a lens mount 50 of the lens barrel 300. The camera mount and the lens mount 50 are, for example, bayonet mounts.

The lens barrel 300 includes a first lens group L1, a second lens group L2, and a third lens group L3 arranged in this order from a subject side (the opposite side to the camera body 200). The positional relationship among the lens groups is adjusted so that their optical axes AX come into line.

The lens barrel 300 includes a second lens group supporting frame 12 that supports the second lens group L2, a fixed barrel 15 that is configured not to be capable of rotating or moving with respect to the lens mount 50 (and the camera body 200), an outer barrel 22 that is fixed to the lens mount 50 and arranged outside of the fixed barrel 15, and a zooming ring 20 that is configured to be capable of rotating around the optical axis AX with respect to the outer barrel 22 and the fixed barrel 15.

The lens barrel 300 also includes supporting frames that support the first lens group L1 and the third lens group L3 thereinside, but the illustration thereof is omitted for convenience sake in illustration and explanation. The supporting frame of the first lens group L1 is fixed to, for example, the inner circumferential surface of the fixed barrel 15 at the subject side while the supporting frame of the third lens group L3 is fixed, for example, to the inside of the lens mount 50. The lens barrel 300 further includes other mechanisms and structures such as a diaphragm mechanism, but the illustration thereof is also omitted.

The second lens group supporting frame 12 is a substantially cylindrical member supporting the second lens group L2, and has an outer circumferential surface including a cam pin 19 protruding.

A cam groove 15a having a shape curved with respect to the optical axis AX direction (spiral shape) (see FIG. 2A) is formed in the fixed barrel 15 so as to pierce through the fixed barrel 15. The cam pin 19 engages with the cam groove 15a. The reason why the cam groove 15a is curved is because the travel distance of the lens group (the second lens group L2 in the present embodiment) is long while the rotating angle of the zooming ring 20 with respect to the fixed barrel 15 is limited to a certain angle in a high-power zoom lens having a zoom ratio of five or more.

The zooming ring 20 includes an operating portion 18 and a barrel portion 17. The operating portion 18 is fixed to the barrel portion 17 by a pin or the like. The zooming ring 20 rotates around the optical axis AX in a state of the inner circumferential surface of the barrel portion 17 following the outer circumferential surface of the fixed barrel 15.

The operating portion 18 has an outer circumferential surface anti-slip finished by rubber or the like. A straight groove 17a extending in the optical axis direction is formed in the barrel portion 17 so as to pierce through the barrel portion 17 (see FIG. 3). The cam pin 19 engages with the straight groove 17a. That is to say, the cam pin 19 is inserted into a place where the cam groove 15a intersects with the straight groove 17a (see FIG. 2C). The straight groove 17a may be a recess groove not piercing through the barrel portion 17.

FIG. 1 illustrates only one cam pin 19, but two or more cam pins 19 may be provided on the outer circumferential surface of the second lens group supporting frame 12. When two or more cam pins 19 are provided, a corresponding number of cam grooves 15a are formed in the fixed barrel 15, and a corresponding number of straight grooves 17a are formed in the barrel portion 17.

Figure 2A:
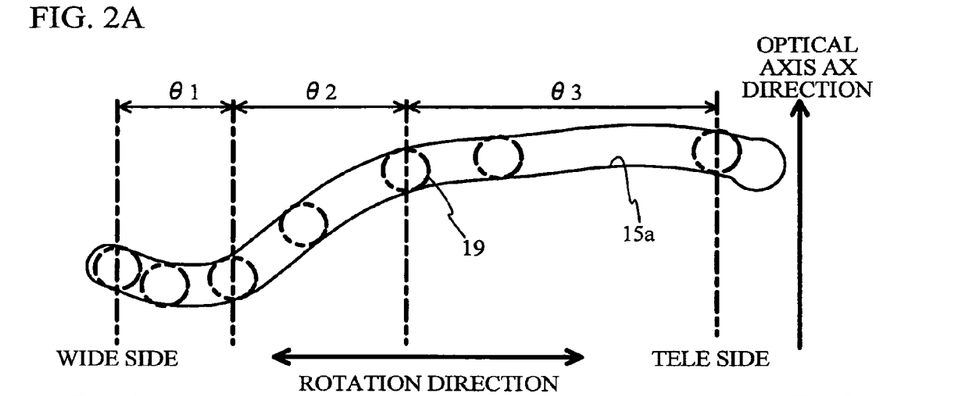
FIG. 2A is a diagram illustrating the movement of a cam pin in a cam groove when a zooming ring is rotated with respect to a fixed barrel.
Figure 2B:
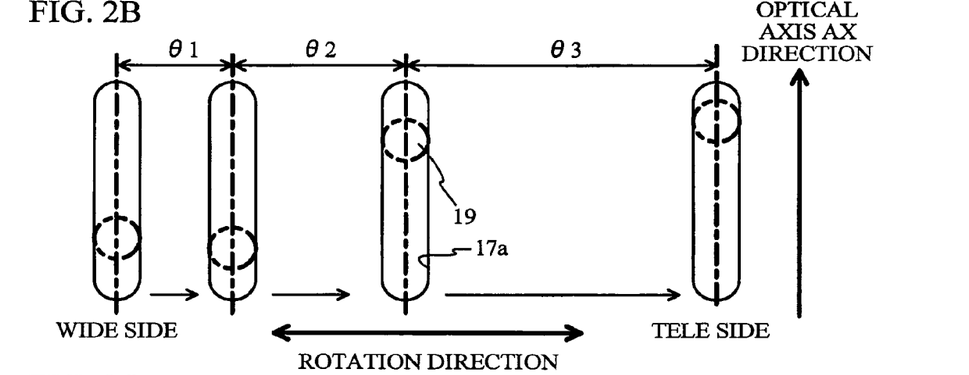
FIG. 2B is a diagram illustrating the movement of the cam pin in a straight groove.
Figure 2C:
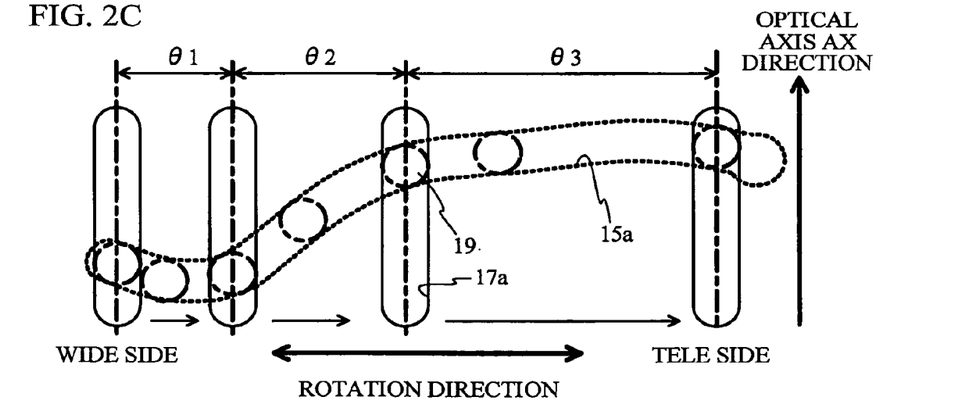
FIG. 2C is a diagram superimposing FIG. 2A on FIG. 2B.

FIG. 2A is a diagram illustrating the movement of the cam pin 19 in the cam groove 15a when the zooming ring 20 is rotated with respect to the fixed barrel 15, and FIG. 2B is a diagram illustrating the movement of the cam pin 19 in the straight groove 17a. FIG. 2C is a diagram superimposing FIG. 2A on FIG. 2B. These diagrams demonstrate that the cam pin 19 engaging with the straight groove 17a moves in the rotation direction together with the zooming ring 20. The cam pin 19, however, also engages with the cam groove 15a and thus moves through the straight groove 17a along the optical axis AX direction while moving in the rotation direction. This allows the second lens group L2 to move in the optical axis AX direction (zooming operation) as the zooming ring 20 rotates.

As illustrated in FIG. 2A to FIG. 2C, the zooming ring 20 can rotate from the wide side to the tele side with respect to the fixed barrel 15 within a range of angles ($\theta1+\theta2+\theta3$). In this case, when the zooming ring 20 is rotated within a range of angles $\theta1$ near the wide side or a range of angles $\theta3$ near the tele side, the difference between the angle of the cam groove 15a (the moving direction of the cam pin 19) and the rotation direction of the zooming ring 20 is small, and thus the cam pin 19 is subjected to low force from the cam groove 15a when moving in the rotation direction. Thus, the cam pin 19 easily moves through the cam groove 15a. In the present embodiment, the cam pin 19 moves more easily within the range of angles $\theta3$ than within the range of angles $\theta1$. On the other hand, when the zooming ring 20 is rotated within a range of angles $\theta2$, which is the middle between the tele side and the wide side, the difference between the angle of the cam groove 15a (the moving direction of the cam pin 19) and the rotation direction of the zooming ring 20 is large, and thus the cam pin 19 is subjected to high force from the cam groove 15a when moving in the rotation direction. Thus, the cam pin 19 has difficulty in moving through the cam groove 15a.

Figure 3:
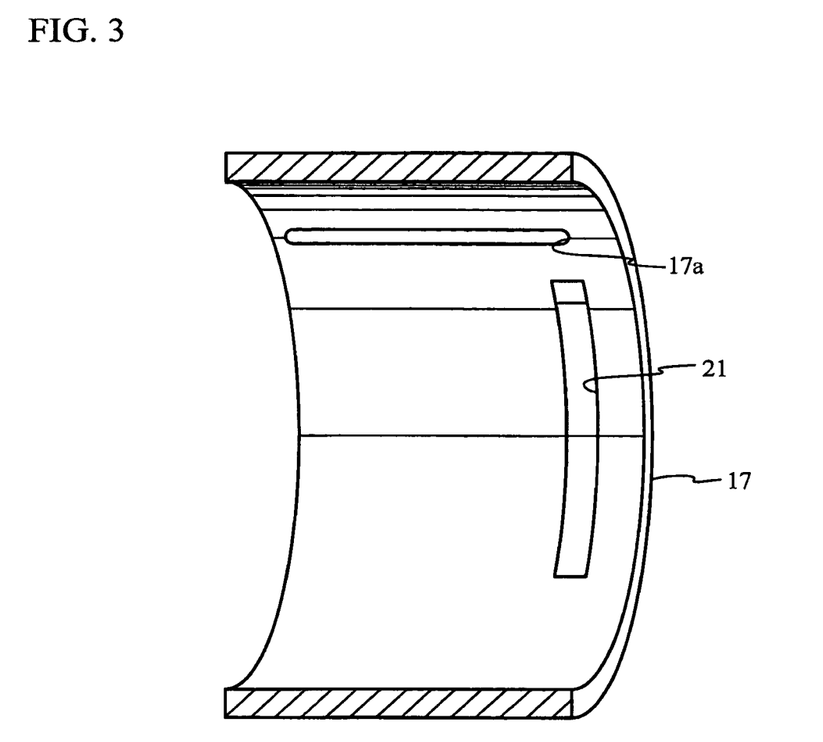
FIG. 3 is a cross-sectional view of a barrel portion.

As demonstrated by FIG. 3 cross-sectionally illustrating the barrel portion 17, the present embodiment forms a recess groove 21 in the barrel portion 17 in addition to the straight groove 17a. The recess groove 21 is formed in the inner circumferential surface of the barrel portion 17 along the circumferential direction.

Figure 4:
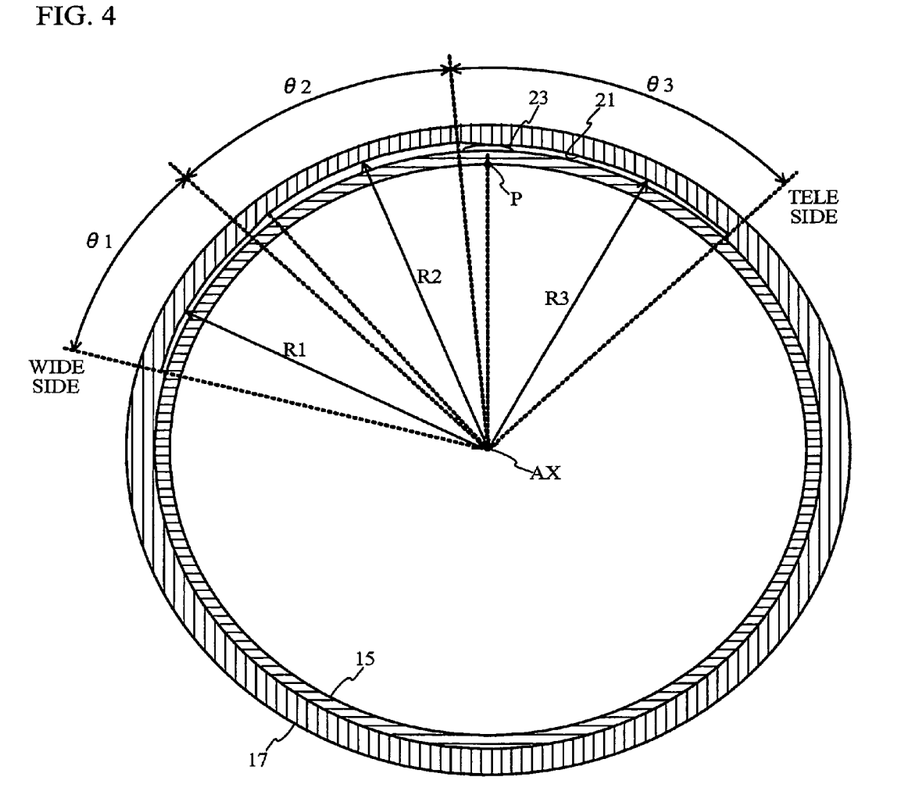
FIG. 4 is a cross-sectional view of the barrel portion and the fixed barrel taken along a plane including a recess groove.

FIG. 4 is a cross-sectional view of the barrel portion 17 and the fixed barrel 15 taken along a plane crossing the recess groove 21 and being perpendicular to the optical axis AX. As illustrated in FIG. 4, the recess groove 21 has a region with a distance in the radial direction from the optical axis AX of R1, a region with a distance of R2 (>R1), and a region with a distance of R3 (<R1<R2).

In the recess groove 21, the region with a distance from the optical axis AX of R1 is a region within which the cam pin 19 faces the reference point of the fixed barrel 15 (described as a point P) when moving within the range of angles θ1 of the cam groove 15a, and corresponds to the range of angles θ1. Moreover, the region with a distance from the optical axis AX of R2 in the recess groove 21 is a region within which the cam pin 19 faces the reference point (point P) of the fixed barrel 15 when moving within the range of angles θ2 of the cam groove 15a, and corresponds to the range of angles θ2. Further, the region with a distance from the optical axis AX of R3 in the recess groove 21 is a region within which the cam pin 19 faces the reference point (point P) of the fixed barrel 15 when moving within the range of angles θ3 of the cam groove 15a, and corresponds to the range of angles θ. The region with a distance of R1 smoothly transitions to the region with a distance of R2 and the region with a distance of R2 smoothly transitions to the region with a distance of R3. Thus, the distance smoothly changes.

The present embodiment provides a spring member 23 at a position facing the recess groove 21 of the fixed barrel 15 (the position of the point P) as illustrated in FIG. 4. The spring member 23 is an arc-curved leaf spring or the like, and has elastic force in the radial direction of the fixed barrel 15. That is to say, while the spring member 23 is in contact with the recess groove 21 (the inner circumferential surface of the barrel portion 17), the spring member 23 exerts outward biasing force in the radial direction of the barrel portion 17 on the recess groove 21.

A description will next be given of a relationship between the spring member 23 and the recess groove 21 when the zooming ring 20 (the barrel portion 17) is rotated with respect to the fixed barrel 15 with reference to FIG. 5A, FIG. 5B, and FIG. 6.

Figure 5A:
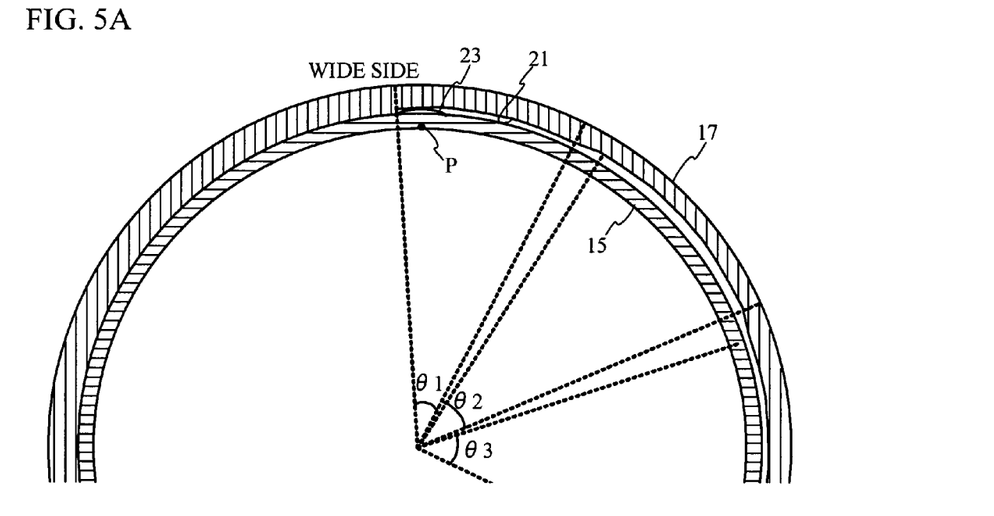
FIG. 5A and FIG. 5B are diagrams illustrating a relationship between a spring member and the recess groove when the zooming ring (barrel portion) is rotated with respect to the fixed barrel (No. 1)

FIG. 5A illustrates a relationship between the barrel portion 17 and the fixed barrel 15 when the second lens group L2 is located at the wide side, i.e. when the point P is located within the range of angles θ1. In the state illustrated in FIG. 5A, the spring member 23 is contact with the recess groove 21, and the spring member 23 exerts biasing force F1 on the barrel portion 17. That is to say, the biasing force F1 acts as damping force (braking force) exerted against the zooming ring 20 rotated from the wide side within the range of angles θ1.

Figure 5B:
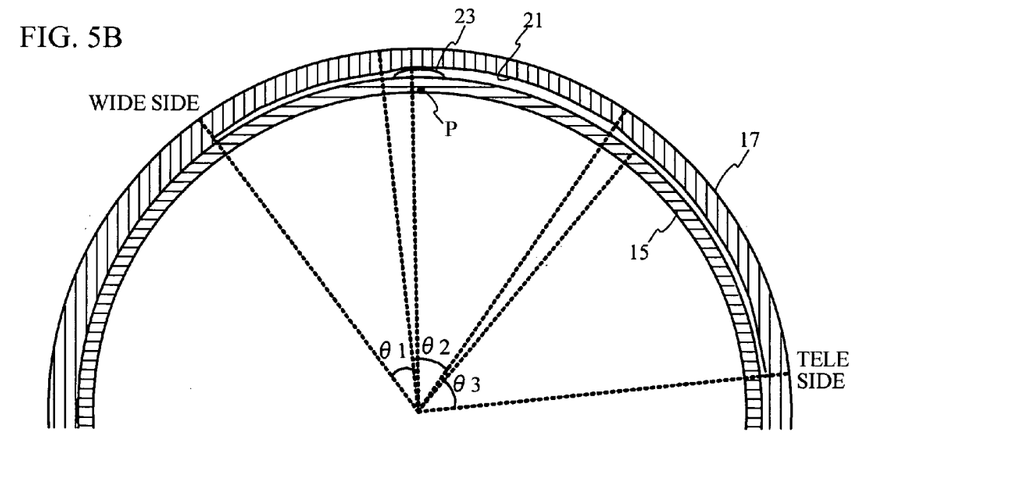

FIG. 5B illustrates a relationship between the barrel portion 17 and the fixed barrel 15 when the second lens group L2 is located in the middle between the wide side and the tele side, i.e. when the point P is located within the range of angles θ2. In the state illustrated in FIG. 5B, the spring member 23 is in slightly contact with the recess groove 21, and the spring member 23 exerts biasing force F2 (<F1) on the barrel portion 17. That is to say, the biasing force F2 acts as damping force (braking force) exerted against the zooming ring 20 rotated within the range of angles θ2.

Figure 6:
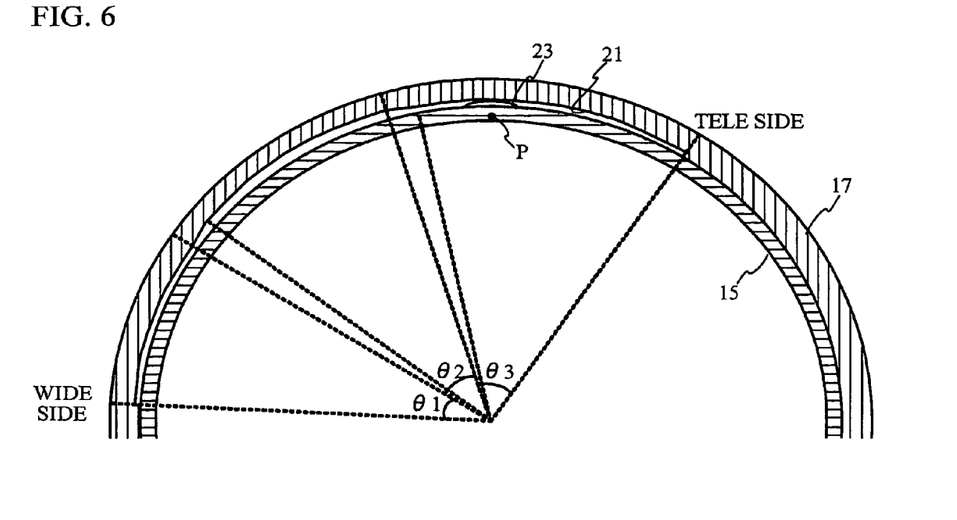
FIG. 6 is a diagram illustrating a relationship between the spring member and the recess groove when the zooming ring (barrel portion) is rotated with respect to the fixed barrel (No. 2)

FIG. 6 illustrates a relationship between the barrel portion 17 and the fixed barrel 15 when the second lens group L2 is located at the tele side, i.e. when the point P is located within the range of angles θ3. In the state illustrated in FIG. 6, the spring member 23 is in contact with the recess groove 21. Here, the distance R3 is less than the distance R1, and thus the spring member 23 exerts biasing force F3 (>F1>F2) on the barrel portion 17. That is to say, the biasing force F3 acts as damping force (breaking force) exerted against the zooming ring 20 rotated from the tele side within the range of angles θ3.

The biasing force (damping force) exerted on the barrel portion 17 from the spring member 23 gradually changes near the boundary between the angles θ1 and θ2 and the boundary between the angles θ2 and θ3.

As described above, in the present embodiment, the biasing force (damping force) exerted on the barrel portion 17 from the spring member 23 is low when the force necessary to rotate the zooming ring 20 is high (when the point P1 is within the range of angles θ2) while the biasing force (damping force) (F1, F3) exerted on the barrel portion 17 from the spring member 23 is high when the force necessary to rotate the zooming ring 20 is low (when the point P is within the range of angles θ1 or θ3). Therefore, the change in the operating torque necessary to rotate the zooming ring 20 (uneven torque) can be reduced, and thus it becomes possible to make the operating torque approximately constant by designing the shape of the recess groove 21 according to the shape of the cam groove 15a.

As described above in detail, the present embodiment configures the cam groove 15a, which has a shape curved with respect to the optical axis AX direction, to be formed in the fixed barrel 15 so as to pierce through the fixed barrel 15, configures the zooming ring 20 (barrel portion 17) to be capable of rotating around the optical axis AX along the outer circumferential surface of the fixed barrel 15 and have the straight groove 17a formed therein, and configures the second lens group supporting frame 12, which supports the lenses inside the fixed barrel 15, to have the cam pin 19 moving along the cam groove 15a and the straight groove 17a and move in the optical axis AX direction as the zooming ring 20 (barrel portion 17) is rotated with respect to the fixed barrel 15, the straight groove 17a extending in the optical axis AX direction. In addition, the spring member 23 applies the biasing force (damping force) depending on the angle of the cam groove 15a to the optical axis AX direction to the barrel portion 17. This configuration enables to reduce the change in the operating torque necessary to rotate the zooming ring 20 by applying the biasing force (damping force) depending on the angle of the cam groove 15a to the optical axis AX direction to the zooming ring 20 (the barrel portion 17) from the spring member 23 even though movability of the cam pin 19 through the cam groove 15a changes in accordance with the angle of the cam groove 15a to the optical axis AX direction as described in the present embodiment. Therefore, the operational feeling is improved, and the zooming operation becomes easy.

The present embodiment can apply the damping force depending on the angle of the cam groove 15a, which engages with the cam pin 19, to the optical axis AX direction with a simple structure having the spring member 23 provided in the fixed barrel 15 and the recess groove 21 formed in the barrel portion 17, and thus, can reduce the increase of production cost and production process, and improve the operation feeling of the zooming ring 20.

The aforementioned embodiment three-step changes the distance from the optical axis of the recess groove 21, but does not intend to suggest any limitation. The distance of the recess groove 21 from the optical axis may be multiple-step changed or seamlessly changed according to the angle of the cam groove to the optical axis. Moreover, the aforementioned embodiment contacts the spring member 23 with the recess groove 21 at all times, but does not intend to suggest any limitation, and the spring member 23 may be in non-contact with the recess groove 21 in part.

The aforementioned embodiment provides the spring member 23 in the fixed barrel 15 and forms the recess groove 21 in the barrel portion 17 of the zooming ring 20, but does not intend to suggest any limitation, and may provide the spring member 23 in the barrel portion 17 and form the recess groove 21 in the outer circumferential surface of the fixed barrel 15. This structure also has the same advantage as that of the aforementioned embodiment.

The aforementioned embodiment provides the spring member 23 in the fixed barrel 15 to exert the biasing force on the barrel portion 17, but does not intend to suggest any limitation, and may use other members capable of exerting the biasing force (e.g. an elastic member such as rubber) instead of the spring member 23.

The aforementioned embodiment changes the damping force exerted on the barrel portion 17 (zooming ring) from the spring member 23 by change of the contacting state between the spring member 23 and the recess groove 21, but does not intend to suggest any limitation. For example, the fixed barrel 15 may have a contacting member that makes contact with the barrel portion 17, and the inner circumferential surface of the barrel portion 17 that is to be in contact with the contacting member may include regions with different friction coefficients (regions having different surface roughness) that change frictional force generated by the contact of the contacting member. In this case, the friction coefficient (surface roughness) is determined based on the angle of the cam groove at which the cam pin 19 is positioned (the angle to the optical axis AX direction). The above-described structure can also have the same advantage as that of the aforementioned embodiment. Also in this case, the contacting member may be provided in the barrel portion 17, and surfaces with different friction coefficients may be provided to the fixed barrel 15.

The aforementioned embodiment describes a lens barrel including the second lens group L2 that rotates as the zooming ring 20 rotates, but does not intend to suggest any limitation. For example, a cylindrical member may be arranged between the second lens group supporting frame 12 and the fixed barrel 15 so that the second lens group L2 does not rotate. In this case, the second lens group L2 can move in the optical axis direction without rotating when a groove engaging with the cam pin 19 and extending in the rotation direction (circumferential direction) around the optical axis is formed in the inner circumferential surface of the cylindrical member and a cam pin engaging with the cam groove 15a and the straight groove 17a is provided in the outer circumferential surface.

Figure 7:
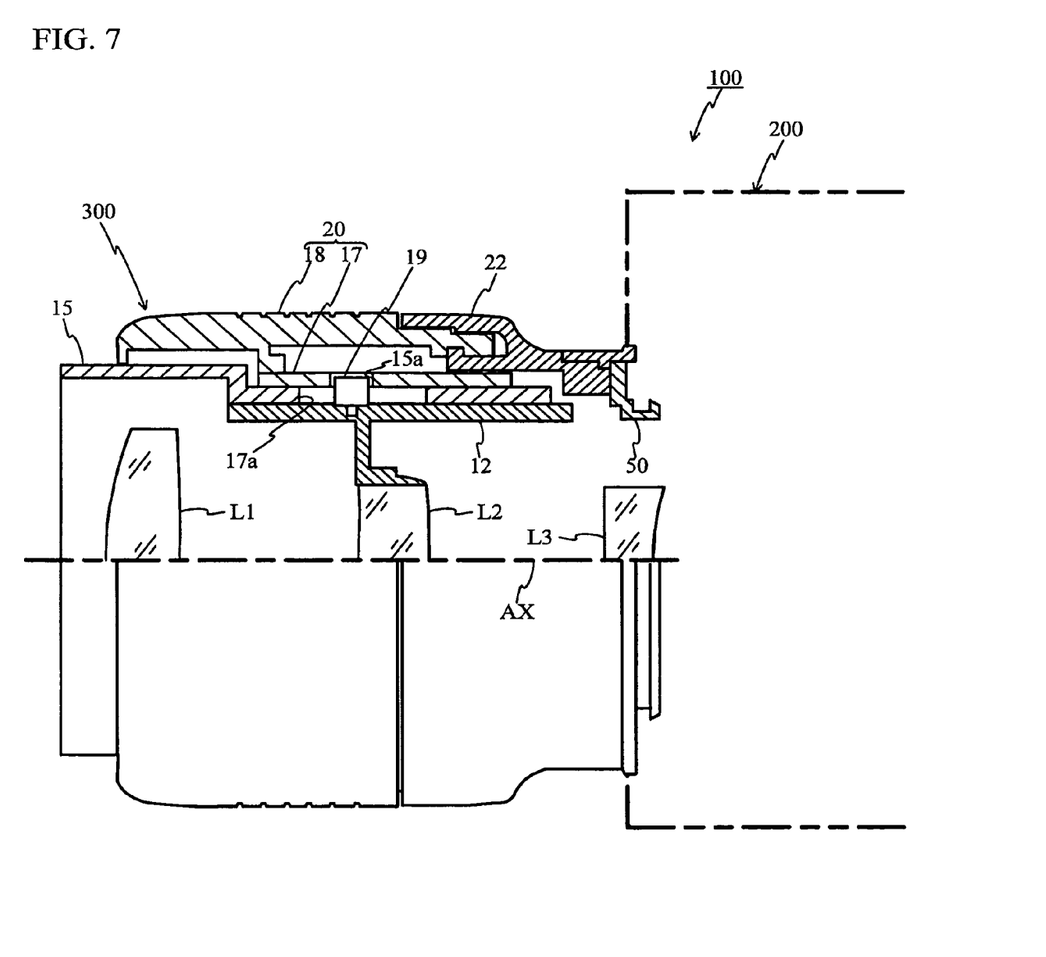
FIG. 7 is a diagram illustrating a camera in accordance with a variation of the embodiment.

The aforementioned embodiment forms the straight groove 17a in the barrel portion 17 of the zooming ring 20 and forms the cam groove 15a in the fixed barrel 15, but does not intend to suggest any limitation. As illustrated in FIG. 7, the cam groove 15a may be formed in the barrel portion 17 while the straight groove 17a is formed in the fixed barrel 15.

The aforementioned embodiment describes only one example of the structure of the lens barrel 300. Thus, various structures may be applied to the structure of a lens barrel.

While the exemplary embodiments of the present invention have been illustrated in detail, the present invention is not limited to the above-mentioned embodiments, and other embodiments, variations and modifications may be made without departing from the scope of the present invention.

The invention claimed is:

1. A lens barrel comprising:
a first barrel in which a cam groove having a shape curved with respect to a predetermined axis direction is formed to pierce through the first barrel;
a second barrel capable of rotating around the predetermined axis along an outer circumferential surface of the first barrel, a straight groove extending in the predetermined axis direction being formed in the second barrel;
a moving member that has a cam pin moving along the cam groove and the straight groove and moves in the predetermined axis direction while holding a lens inside the first barrel as the second barrel rotates with respect to the first barrel; and
a damping mechanism that applies damping force depending on an angle of the cam groove to the predetermined axis direction to the second barrel,
wherein the damping mechanism includes a contacting member that is provided in the outer circumferential surface of the first barrel and makes contact with at least a part of an inner circumferential surface of the second barrel, and
the contacting member has a contacting/non-contacting state with the inner circumferential surface of the second barrel that is changed in accordance with a position of the cam pin in the cam groove.

2. The lens barrel according to claim 1, wherein
the contacting member is urged by force directed toward a plane facing the contacting member at all times.

3. An optical apparatus comprising:
the lens barrel according to claim 1.

4. A lens barrel comprising:
a first barrel in which a cam groove having a shape curved with respect to a predetermined axis direction is formed to pierce through the first barrel;
a second barrel capable of rotating around the predetermined axis along an outer circumferential surface of the first barrel, a straight groove extending in the predetermined axis direction being formed in the second barrel;
a moving member that has a cam pin moving along the cam groove and the straight groove and moves in the predetermined axis direction while holding a lens inside the first barrel as the second barrel rotates with respect to the first barrel; and
a damping mechanism that applies damping force depending on an angle of the cam groove to the predetermined axis direction to the second barrel,
wherein the damping mechanism includes a contacting member that is
provided in an inner circumferential surface of the second barrel and makes contact with at least a part of the outer circumferential surface of the first barrel, and
the contacting member has a contacting/non-contacting state with the outer circumferential surface of the first barrel that is changed in accordance with a position of the cam pin in the cam groove.

5. An optical apparatus comprising:
the lens barrel according to claim 4.

6. The lens barrel according to claim 4, wherein
the contacting member is urged by force directed toward a plane facing the contacting member at all times.

7. A lens barrel comprising:
a first barrel in which a cam groove having a shape curved with respect to a predetermined axis direction is formed to pierce through the first barrel;
a second barrel capable of rotating around the predetermined axis along an
outer circumferential surface of the first barrel, a straight groove extending in the predetermined axis direction being formed in the second barrel;
a moving member that has a cam pin moving along the cam groove and the straight groove and moves in the predetermined axis direction while holding a lens inside the first barrel as the second barrel rotates with respect to the first barrel; and
a damping mechanism that applies damping force depending on an angle of the cam groove to the predetermined axis direction to the second barrel, wherein the damping mechanism includes a contacting member that is provided in the outer circumferential surface of the first barrel and makes contact with at least a part of an inner circumferential surface of the second barrel, and the contacting member makes contact with one of a plurality of regions with different friction coefficients in the inner circumferential surface of the second barrel in accordance with a position of the cam pin in the cam groove.

8. An optical apparatus comprising:
the lens barrel according to claim 7.

9. The lens barrel according to claim 7, wherein
the contacting member is urged by force directed toward a plane facing the contacting member at all times.

10. A lens barrel comprising:
a first barrel in which a cam groove having a shape curved with respect to a predetermined axis direction is formed to pierce through the first barrel;
a second barrel capable of rotating around the predetermined axis along an outer circumferential surface of the first barrel, a straight groove extending in the predetermined axis direction being formed in the second barrel;
a moving member that has a cam pin moving along the cam groove and the straight groove and moves in the predetermined axis direction while holding a lens inside the first barrel as the second barrel rotates with respect to the first barrel; and
a damping mechanism that applies damping force depending on an angle of the cam groove to the predetermined axis direction to the second barrel,
wherein the damping mechanism includes a contacting member that is
provided in an inner circumferential surface of the second barrel and makes contact with at least a part of the outer circumferential surface of the first barrel, and
the contacting member makes contact with one of a plurality of regions having different friction coefficients provided in the outer circumferential surface of the first barrel in accordance with a position of the cam pin in the cam groove.

11. An optical apparatus comprising:
the lens barrel according to claim 10.

12. The lens barrel according to claim 10, wherein
the contacting member is urged by force directed toward a plane facing the contacting member at all times.

13. A lens barrel comprising:
a first barrel in which a straight groove extending in a predetermined axis direction is formed to pierce through the first barrel;
a second barrel capable of rotating around the predetermined axis along an outer circumferential surface of the first barrel, a cam groove having a shape curved with respect to the predetermined axis direction being formed in the second barrel;
a moving member that has a cam pin moving along the straight groove and the cam groove and moves in the predetermined axis direction while holding a lens inside the first barrel as the second barrel rotates with respect to the first barrel; and
a damping mechanism that applies damping force depending on an angle of the cam groove to the predetermined axis direction to the second barrel,
wherein the damping mechanism includes a contacting member that is provided in the outer circumferential surface of the first barrel and makes contact with at least a part of an inner circumferential surface of the second barrel, and the contacting member has a contacting/non-contacting state with the inner circumferential surface of the second barrel in accordance with a position of the cam pin in the cam groove.

14. The lens barrel according to claim 13, wherein
the contacting member is urged by force directed toward a plane facing the contacting member at all times.

15. An optical apparatus comprising:
the lens barrel according to claim 13.

16. A lens barrel comprising:
a first barrel in which a straight groove extending in a predetermined axis direction is formed to pierce through the first barrel;
a second barrel capable of rotating around the predetermined axis along an outer circumferential surface of the first barrel, a cam groove having a shape curved with respect to the predetermined axis direction being formed in the second barrel;
a moving member that has a cam pin moving along the straight groove and the cam groove and moves in the predetermined axis direction while holding a lens inside the first barrel as the second barrel rotates with respect to the first barrel; and
a damping mechanism that applies damping force depending on an angle of the cam groove to the predetermined axis direction to the second barrel,
wherein the damping mechanism includes a contacting member that is
provided in an inner circumferential surface of the second barrel and makes contact with at least a part of the outer circumferential surface of the first barrel, and
the contacting member has a contacting/non-contacting state with the outer circumferential surface of the first barrel that is changed in accordance with a position of the cam pin in the cam groove.

17. The lens barrel according to claim 16, wherein
the contacting member is urged by force directed toward a plane facing the contacting member at all times.

18. An optical apparatus comprising:
the lens barrel according to claim 16.

19. A lens barrel comprising:
a first barrel in which a straight groove extending in a predetermined axis direction is formed to pierce through the first barrel;
a second barrel capable of rotating around the predetermined axis along an outer circumferential surface of the first barrel, a cam groove having a shape curved with respect to the predetermined axis direction being formed in the second barrel;
a moving member that has a cam pin moving along the straight groove and the cam groove and moves in the predetermined axis direction while holding a lens inside the first barrel as the second barrel rotates with respect to the first barrel; and
a damping mechanism that applies damping force depending on an angle of the cam groove to the predetermined axis direction to the second barrel,
wherein the damping mechanism includes a contacting member that is provided in the outer circumferential surface of the first barrel and makes contact with at least a part of an inner circumferential surface of the second barrel, and
the contacting member makes contact with one of a plurality of regions with different friction coefficients in the inner circumferential surface of the second barrel in accordance with a position of the cam pin in the cam groove.

20. The lens barrel according to claim 19, wherein the contacting member is urged by force directed toward a plane facing the contacting member at all times.

21. An optical apparatus comprising:
the lens barrel according to claim 19.

22. A lens barrel comprising:
a first barrel in which a straight groove extending in a predetermined axis direction is formed to pierce through the first barrel;
a second barrel capable of rotating around the predetermined axis along an outer circumferential surface of the first barrel, a cam groove having a shape curved with respect to the predetermined axis direction being formed in the second barrel;
a moving member that has a cam pin moving along the straight groove and the cam groove and moves in the predetermined axis direction while holding a lens inside the first barrel as the second barrel rotates with respect to the first barrel; and
a damping mechanism that applies damping force depending on an angle of the cam groove to the predetermined axis direction to the second barrel,
wherein the damping mechanism includes a contacting member that is provided in an inner circumferential surface of the second barrel and makes contact with at least a part of the outer circumferential surface of the first barrel, and
the contacting member makes contact with one of a plurality of regions having different friction coefficients provided in the outer circumferential surface of the first barrel in accordance with a position of the cam pin in the cam groove.

23. The lens barrel according to claim 22, wherein the contacting member is urged by force directed toward a plane facing the contacting member at all times.

24. An optical apparatus comprising:
the lens barrel according to claim 22.

25. A method of producing a lens barrel, the method comprising:
providing a first barrel in which a cam groove having a shape curved with respect to a predetermined axis direction is formed to pierce through the first barrel;
providing a second barrel capable of rotating around the predetermined axis along an outer circumferential surface of the first barrel, a straight groove extending in the predetermined axis direction being formed in the second barrel;
providing a moving member that has a cam pin moving along the cam groove and the straight groove and moves in the predetermined axis direction while holding a lens inside the first barrel as the second barrel rotates with respect to the first barrel; and
providing a damping mechanism that applies damping force depending on an angle of the cam groove to the predetermined axis direction to the second barrel,
wherein the damping mechanism includes a contacting member that is provided in the outer circumferential surface of the first barrel and makes contact with at least a part of an inner circumferential surface of the second barrel, and
the contacting member has a contacting/non-contacting state with the inner circumferential surface of the second barrel that is changed in accordance with a position of the cam pin in the cam groove.

26. The method according to claim 25, wherein the contacting member is urged by force directed toward a plane facing the contacting member at all times.

27. A method of producing a lens barrel, the method comprising: providing a first barrel in which a cam groove having a shape curved with respect to a predetermined axis direction is formed to pierce through the first barrel;
providing a second barrel capable of rotating around the predetermined axis along an outer circumferential surface of the first barrel, a straight groove extending in the predetermined axis direction being formed in the second barrel;
providing a moving member that has a cam pin moving along the cam groove and the straight groove and moves in the predetermined axis direction while holding a lens inside the first barrel as the second barrel rotates with respect to the first barrel; and
providing a damping mechanism that applies damping force depending on an angle of the cam groove to the predetermined axis direction to the second barrel,
wherein the damping mechanism includes a contacting member that is provided in an inner circumferential surface of the second barrel and makes contact with at least a part of the outer circumferential surface of the first barrel, and
the contacting member has a contacting/non-contacting state with the outer circumferential surface of the first barrel that is changed in accordance with a position of the cam pin in the cam groove.

28. The method according to claim 27, wherein the contacting member is urged by force directed toward a plane facing the contacting member at all time.

29. A method of producing a lens barrel, the method comprising:
providing a first barrel in which a cam groove having a shape curved with respect to a predetermined axis direction is formed to pierce through the first barrel;
providing a second barrel capable of rotating around the predetermined axis along an outer circumferential surface of the first barrel, a straight groove extending in the predetermined axis direction being formed in the second barrel;
providing a moving member that has a cam pin moving along the cam groove and the straight groove and moves in the predetermined axis direction while holding a lens inside the first barrel as the second barrel rotates with respect to the first barrel; and
providing a damping mechanism that applies damping force depending on an angle of the cam groove to the predetermined axis direction to the second barrel,
wherein the damping mechanism includes a contacting member that is provided in the outer circumferential surface of the first barrel and makes contact with at least a part of an inner circumferential surface of the second barrel, and
the contacting member makes contact with one of a plurality of regions with different friction coefficients in the inner circumferential surface of the second barrel in accordance with a position of the cam pin in the cam groove.

30. The method according to claim 29, wherein the contacting member is urged by force directed toward a plane facing the contacting member at all time.

31. A method of producing a lens barrel, the method comprising: providing a first barrel in which a cam groove having a shape curved with respect to a predetermined axis direction is formed to pierce through the first barrel;

providing a second barrel capable of rotating around the predetermined axis along an outer circumferential surface of the first barrel, a straight groove extending in the predetermined axis direction being formed in the second barrel;

providing a moving member that has a cam pin moving along the cam groove and the straight groove and moves in the predetermined axis direction while holding a lens inside the first barrel as the second barrel rotates with respect to the first barrel; and providing a damping mechanism that applies damping force depending on an angle of the cam groove to the predetermined axis direction to the second barrel, wherein the damping mechanism includes a contacting member that is provided in an inner circumferential surface of the second barrel and makes contact with at least a part of the outer circumferential surface of the first barrel, and the contacting member makes contact with one of a plurality of regions having different friction coefficients provided in the outer circumferential surface of the first barrel in accordance with a position of the cam pin in the cam groove.

32. The method according to claim 31, wherein the contacting member is urged by force directed toward a plane facing the contacting member at all times.

33. A method of producing a lens barrel, the method comprising:

providing a first barrel in which a straight groove extending in a predetermined axis direction is formed to pierce through the first barrel;

providing a second barrel capable of rotating around the predetermined axis along an outer circumferential surface of the first barrel, a cam groove having a shape curved with respect to the predetermined axis direction being formed in the second barrel;

providing a moving member that has a cam pin moving along the straight groove and the cam groove and moves in the predetermined axis direction while holding a lens inside the first barrel as the second barrel rotates with respect to the first barrel; and providing a damping mechanism that applies damping force depending on an angle of the cam groove to the predetermined axis direction to the second barrel, wherein the damping mechanism includes a contacting member that is provided in the outer circumferential surface of the first barrel and makes contact with at least a part of an inner circumferential surface of the second barrel, and the contacting member has a contacting/non-contacting state with the inner circumferential surface of the second barrel in accordance with a position of the cam pin in the cam groove.

34. The method according to claim 33, wherein the contacting member is urged by force directed toward a plane facing the contacting member at all times.

35. A method of producing a lens barrel, the method comprising:

providing a first barrel in which a straight groove extending in a predetermined axis direction is formed to pierce through the first barrel;

providing a second barrel capable of rotating around the predetermined axis along an outer circumferential surface of the first barrel, a cam groove having a shape curved with respect to the predetermined axis direction being formed in the second barrel;

providing a moving member that has a cam pin moving along the straight groove and the cam groove and moves in the predetermined axis direction while holding a lens inside the first barrel as the second barrel rotates with respect to the first barrel; and providing a damping mechanism that applies damping force depending on an angle of the cam groove to the predetermined axis direction to the second barrel, wherein the damping mechanism includes a contacting member that is provided in an inner circumferential surface of the second barrel and makes contact with at least a part of the outer circumferential surface of the first barrel, and the contacting member has a contacting/non-contacting state with the outer circumferential surface of the first barrel that is changed in accordance with a position of the cam pin in the cam groove.

36. The method according to claim 35, wherein the contacting member is urged by force directed toward a plane facing the contacting member at all times.

37. A method of producing a lens barrel, the method comprising:

providing a first barrel in which a straight groove extending in a predetermined axis direction is formed to pierce through the first barrel;

providing a second barrel capable of rotating around the predetermined axis along an outer circumferential surface of the first barrel, a cam groove having a shape curved with respect to the predetermined axis direction being formed in the second barrel;

providing a moving member that has a cam pin moving along the straight groove and the cam groove and moves in the predetermined axis direction while holding a lens inside the first barrel as the second barrel rotates with respect to the first barrel; and providing a damping mechanism that applies damping force depending on an angle of the cash groove to the predetermined axis direction to the second barrel, wherein the damping mechanism includes a contacting member that is provided in the outer circumferential surface of the first barrel and makes contact with at least a part of an inner circumferential surface of the second barrel, and the contacting member makes contact with one of a plurality of regions with different friction coefficients in the inner circumferential surface of the second barrel in accordance with a position of the cam pin in the cam groove.

38. The method according to claim 37, wherein the contacting member is urged by force directed toward a plane facing the contacting member at all times.

39. A method of producing a lens barrel, the method comprising:

providing a first barrel in which a straight groove extending in a predetermined axis direction is formed to pierce through the first barrel;

providing a second barrel capable of rotating around the predetermined axis along an outer circumferential surface of the first barrel, a cam groove having a shape curved with respect to the predetermined axis direction being formed in the second barrel;

providing a moving member that has a cam pin moving along the straight groove and the cam groove and moves in the predetermined axis direction while holding a lens inside the first barrel as the second barrel rotates with respect to the first barrel; and providing a damping mechanism that applies damping force depending on an angle of the cam groove to the predetermined axis direction to the second barrel,
wherein the damping mechanism includes a contacting member that is
provided in an inner circumferential surface of the second barrel and makes contact with at least a part of the outer circumferential surface of the first barrel, and
the contacting member makes contact with one of a plurality of regions having different friction coefficients provided in the outer circumferential surface of the first barrel in accordance with a position of the cam pin in the earn groove.

40. The method according to claim 39, wherein
the contacting member is urged by force directed toward a plane facing the contacting member at all times.

\* \* \* \* \*